No. 856,561. PATENTED JUNE 11, 1907.
C. J. ALLEY.
MACHINE FOR USE IN CHIMING AND CROZING BARRELS.
APPLICATION FILED NOV. 1, 1905.
2 SHEETS—SHEET 1.
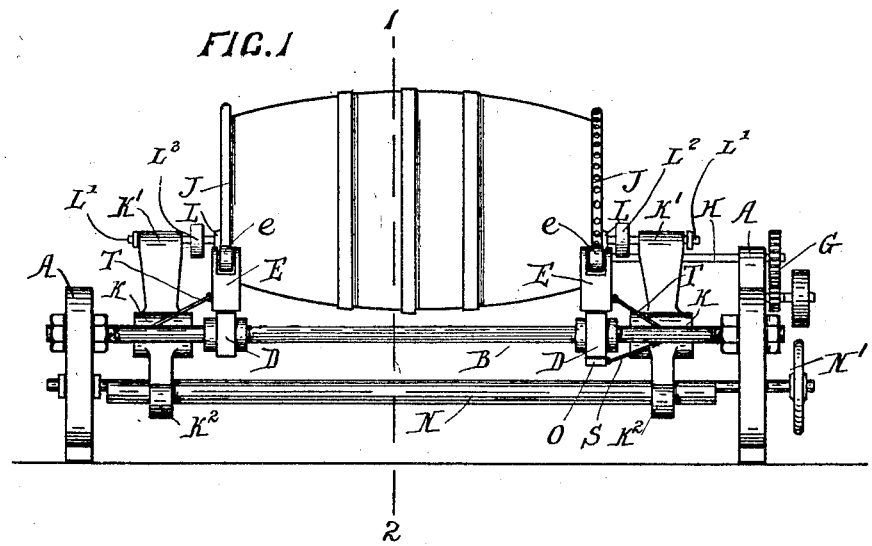
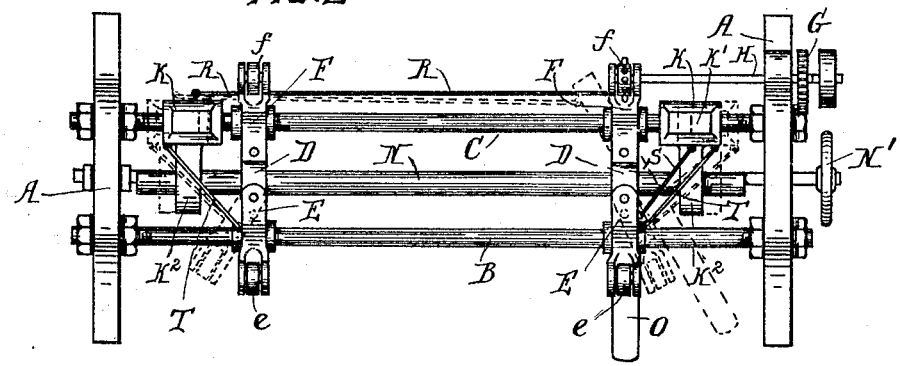
WITNESSES:
F. H. Logan
H. H. Berrigan
INVENTOR,
CHARLES JOHN ALLEY,
BY H. van Oldenneel
HIS ATTORNEY.

No. 856,561. PATENTED JUNE 11, 1907.
C. J. ALLEY.
MACHINE FOR USE IN CHIMING AND CROZING BARRELS.
APPLICATION FILED NOV. 1, 1905.
2 SHEETS—SHEET 2.
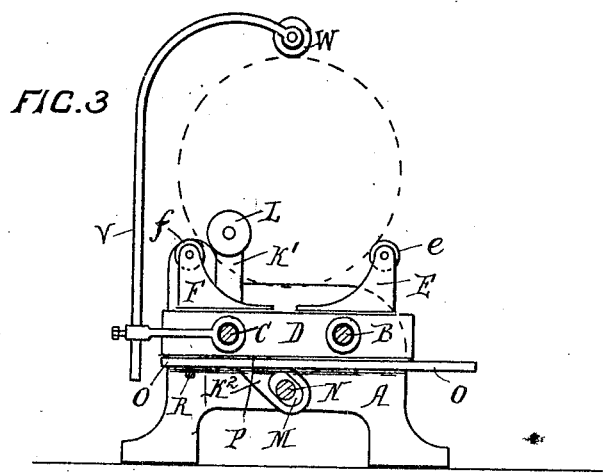
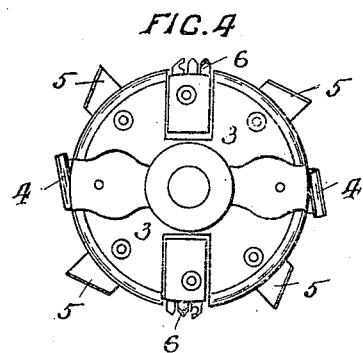
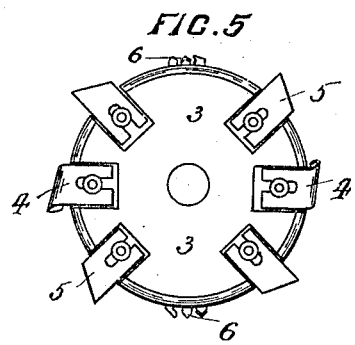
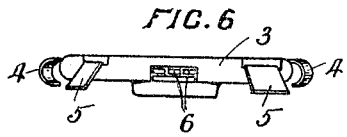
WITNESSES;
INVENTOR,
CHARLES JOHN ALLEY,
BY
HIS ATTORNEY.

UNITED STATES PATENT OFFICE.

CHARLES JOHN ALLEY, OF FARNDON, NEW ZEALAND.

MACHINE FOR USE IN CHIMING AND CROZING BARRELS.

No. 856,561. Specification of Letters Patent. Patented June 11, 1907.

Application filed November 1, 1905. Serial No. 285,385.

*To all whom it may concern:*

Be it known that I, CHARLES JOHN ALLEY, a subject of the King of Great Britain, residing at Farndon, in the Colony of New Zealand, have invented a new and useful Machine for Use in Chiming and Crozing Barrels; and I do hereby declare the following to be a full, clear, and exact description of the same.

This invention relates to an improved machine to be used in the operations of chiming, crozing and howeling, in the manufacture of barrels and like articles, such as wooden tubs.

The invention will be described with reference to the accompanying sheet of drawings, in which:—

Figure 1 is a side elevation of the machine, showing a barrel in position thereon; Fig. 2 is a plan of the machine with the barrel and cutters removed therefrom; Fig. 3 is a sectional side elevation, on the line 1—2 of Fig. 1 and looking toward the left; Figs. 4, 5, and 6 are, respectively, front elevation, back elevation and plan of a form of cutter for performing the chiming, crozing, and howeling operations, adapted for use in the machine.

The machine comprises two end cheeks or standards A that are joined together by two bars B, C, extending in parallel lines between them. Upon these bars are carried two sliding heads D placed one near each cheek, and capable of adjustment in their distance apart.

Upon the top surface of each head are secured a pair of frames, E, F, each one projecting upward and carrying a roller $(e)$, $(f)$, at its upper end, free to revolve on a horizontal axis. The frames are adjustable in their distance apart from each other, while the front frame E, on each head, is pivoted thereon so as to be capable of swinging out in a horizontal plane.

The heads with the roller-carrying frames will serve to support a barrel placed therein, in the manner shown in Fig. 1, so that such barrel will be capable of rotating while thus supported. The heads being adjustable in their distance apart and the carrier frames being made so adjustable also, will permit of the machine being arranged to suit varying sizes of barrels.

Means are provided whereby the barrel may be rotated. In the drawings, the means shown consist of gearing G driving a shaft H upon which is mounted one of the carrying rollers $(f)$, which in this instance is formed as a pinion. The barrel ends are inserted within the truss hoops J, usually employed for keeping them in place while the chiming and crozing operations are being performed, and one of these hoops is formed with perforations in it with which the teeth of the pinion carrier $(f)$ will engage. Other means for revolving the barrels may be devised if so desired.

The front carriers E, being pivoted to the heads, will permit of them being turned outward on their pivots and thus allow of the barrels being rolled into the machine and then kept therein by turning the carriers back again. This will obviate any necessity of lifting the barrels up and lowering them into position within the machine.

Upon the rear bar C and at each end thereof, outside the respective carrier heads, are mounted the cutter carriers. Each one of these carriers consists of a boss portion K, loosely threaded on the bar, with a vertically upwardly extending member K' and a downwardly extending member $K^2$. The cutter heads L are rotatably connected with the upper ends of the members K' in any suitable and convenient manner and may drive by the small pulleys $L^2$, $L^3$ mounted on shaft L' to which the cutter heads are secured. The members $K^2$ of the cutter carriers are each formed with a slot M extending through them, and through these slots, an eccentrically mounted shaft N is passed, the ends of which are mounted in the cheeks A of the machine and which shaft is provided with a lever or wheel N' by means of which it may be turned. On turning the shaft the members $K^2$ will be raised or depressed thus causing the bosses K to turn on the bar C and the members K' carrying the cutters to move in a backward or forward direction relatively to the front of the machine.

The cutter carriers are capable of movement along the bar C so that the cutters may be caused to enter the ends of a barrel placed in the machine, and when in this position, be tipped by the movement of the eccentric shaft N to engage with or free the barrel.

Means are provided whereby the pivoted barrel carriers E may be turned outward on their pivots and the cutter carriers moved along the bar C away from the ends of the barrels, and also by which the reverse operations may be performed, by the operation of a single lever. These means consist of the lever arm O pivoted at P beneath one of the heads D. On one side of its pivot, this lever is connected by means of a rod R with one of the cutter carriers, and upon the other side of its pivot, by means of the rod S, with the other cutter carrier. The cutter carriers are then connected by means of rods T with the pivoted barrel carriers E at their respective ends. By thus moving the lever arm O to the position shown in dotted lines in Fig. 2, the rods R and S will force the cutter carriers outward along the rod C carrying them, while this movement of the cutter carriers will be communicated to the respective pivoted barrel carriers E, through the rods T, to cause them to turn outward on their pivots. In like manner the reverse movement of the lever arm O will draw the cutter carriers in and close the pivoted barrel carriers.

In operation, the machine is prepared to receive a barrel by opening the carriers in the way before described. The barrel is then rolled into it and the carriers E closed, when the barrel will be supported upon the rollers (e), (f). At the same time the cutter carriers will be moved inward to cause the cutter heads L to pass into the ends of the barrel. The barrel is caused to revolve, and the cutter heads are tipped, by turning the eccentric shaft N to cause them to engage with and act upon the inside face of the barrel in the desired manner. When the operations are completed, the cutters are tipped back out of engagement with the barrel, and the cutter carriers moved out and the barrel carriers E opened by the movement of the lever O, when the barrel will be free to roll out. At the same time, the machine will be placed in condition to receive a fresh barrel.

It will be obvious that the lengths of the rods R, S and T must be made adjustable in order that the machine may be made to suit different sizes of barrels.

In order to insure that the barrels, while being operated upon in the machine, shall retain their proper position therein, a stay rod V (Fig. 3) may be employed secured to the back of the machine and extending up over the top thereof. In the upper extremity, a small antifriction roller W is mounted, which roller will engage with the top of the barrel in the machine and prevent it rising therein. The rod V will be made vertically adjustable so that it may be regulated to suit different sizes of barrels.

In Figs. 4, 5 and 6, an arrangement and construction of cutter head and cutters suitable for performing the operations of chiming, crozing and howeling are shown. These, however, form no essential feature of the invention, as other arrangements may be readily adapted for use therewith. The cutter head (3) consists of a circular plate, the edge of which is rounded. To the back face of the head are secured two gouge-shaped cutters (4) arranged diametrically opposite each other and the curved cutting edges of which overlie the rounded edge of the plate (3). These cutters serve to perform the howeling operation. Secured also upon this face are four beveling cutters (5) the cutting edges of which also overlie the edge of the plate. These six cutters serve to perform the howeling and chiming or beveling operation upon the ends of the barrel. Secured to the other face of the plate (3) are the two crozing cutters (6), arranged diametrically opposite each other, and each consisting of three chisel points, two of which are placed at right angles to the third. The faces of the plate are grooved to receive the various cutters so that they shall lie beneath the surfaces thereof. Sufficient clearances for the cuttings to get away are provided so that the cutters shall not become choked therewith.

What I do claim as my invention, and desire to secure by Letters Patent, is:—

1. In machines for use in chiming, crozing and howeling barrels, a pair of barrel-carrying heads mounted on parallel horizontal bars and capable of sliding movement thereon, a pair of upwardly extending frames secured upon the top face of each head and supporting rollers on horizontal axes at their upper ends, and the front one of which frames is pivoted so as to be capable of turning in a horizontal plane, and means for rotating a barrel supported on the rollers, substantially as specified.

2. In machines for use in chiming, crozing, and howeling barrels, a pair of barrel-carrying heads mounted on parallel horizontal bars and capable of sliding movement thereon, a pair of upwardly extending frames secured upon the top face of each head and supporting rollers on horizontal axes at their upper ends, and the front one of which frames is pivoted so as to be capable of turning in a horizontal plane and means for rotating a barrel supported on the rollers, in combination with cutter carriers mounted on one of the horizontal bars, one at each end of the machine, and capable of sliding movement thereon, substantially as specified.

3. In machines for use in chiming, crozing, and howeling barrels, a pair of barrel-carrying heads mounted on parallel horizontal bars and capable of sliding movement thereon, a pair of upwardly extending frames secured upon the top face of each head and supporting rollers on horizontal axes at their upper ends, and the front one of which frames is pivoted so as to be capable of turning in a horizontal plane and means for rotating a barrel supported on the rollers, in combination with cutter carriers mounted on one of the horizontal bars, one at each end of the machine, and capable of sliding movement thereon, and means whereby the cutter carriers may be moved in an outward direction simultaneously with the outward turning of the pivoted frames and moved in a reverse direction upon the closing of such frames, substantially as specified.

4. In machines for use in chiming, crozing and howeling barrels, a pair of barrel-carrying heads mounted on parallel horizontal bars and capable of sliding movement thereon, a pair of upwardly extending frames secured upon the top face of each head and supporting rollers on horizontal axes at their upper ends, and the front one of which frames is pivoted so as to be capable of turning in a horizontal plane, and means for rotating a barrel supported on the rollers in combination with cutter carriers mounted on one of the horizontal bars, one at each end of the machine, and capable of sliding movement thereon, rods connecting the cutter carriers and pivoted frames at each end together, a lever arm pivoted on the machine and rods connecting the respective cutter carriers to the lever on opposite sides of its pivot, substantially as specified.

5. In machines for use in chiming, crozing and howeling barrels, a pair of barrel-carrying heads mounted on parallel horizontal bars and capable of sliding movement thereon, a pair of upwardly extending frames secured upon the top face of each head and supporting rollers on horizontal axes at their upper ends, and the front one of which frames is pivoted so as to be capable of turning in a horizontal plane, and means for rotating a barrel supported on the rollers, in combination with cutter carriers mounted on one of the horizontal bars, one at each end of the machine, and capable of sliding movement thereon, such cutter carriers being each formed with an upwardly extending portion adapted to support a cutter head and with a downwardly extending portion formed with a slot therein, and an eccentric shaft passing through such slots and provided with means whereby it may be turned, substantially as specified.

In testimony whereof, I have signed this specification in the presence of two subscribing witnesses.

CHARLES JOHN ALLEY.

Witnesses:
H. ALEXANDER,
G. T. WIX.